Dec. 21, 1926.

J. J. LAWLER 1,611,650

MIXING VALVE FOR EITHER SHOWER OR TUB BATH PURPOSES

Filed August 13, 1925    2 Sheets-Sheet 1

Inventor
J. J. Lawler

By Bryant & Lowry
Attorneys

Dec. 21, 1926.

J. J. LAWLER 1,611,650

MIXING VALVE FOR EITHER SHOWER OR TUB BATH PURPOSES

Filed August 13, 1925    2 Sheets-Sheet 2

Inventor
J. J. Lawler

By Bryant & Lowry
Attorneys

Patented Dec. 21, 1926.

1,611,650

UNITED STATES PATENT OFFICE.

JAMES J. LAWLER, OF MOUNT VERNON, NEW YORK.

MIXING VALVE FOR EITHER SHOWER OR TUB BATH PURPOSES.

Application filed August 13, 1925. Serial No. 50,031.

The primary object of the invention is to provide a mixing valve for either shower or tub bath purposes which is thermostatically controlled to prevent the delivery of water at a scalding or injurious temperature.

A further object of the invention is to provide a mixing valve of the above mentioned type which is graduated by a single handle capable of actuation to deliver water ranging in temperature from the normal temperature of the cold water supply to the fixed degree set by the thermostat, usually 100 to 110 degrees Fahrenheit, thus protecting the user from injury by overheated water.

Figure 2:
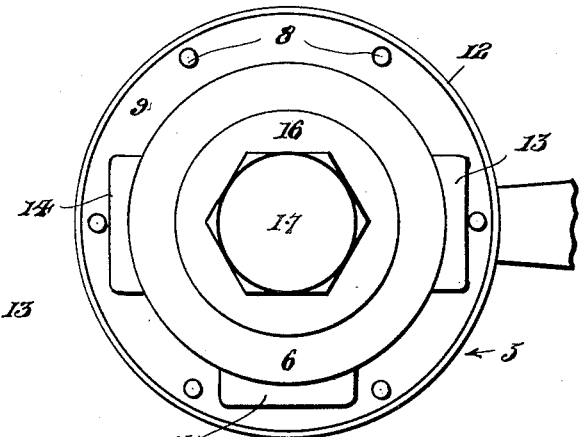
Figure 1:
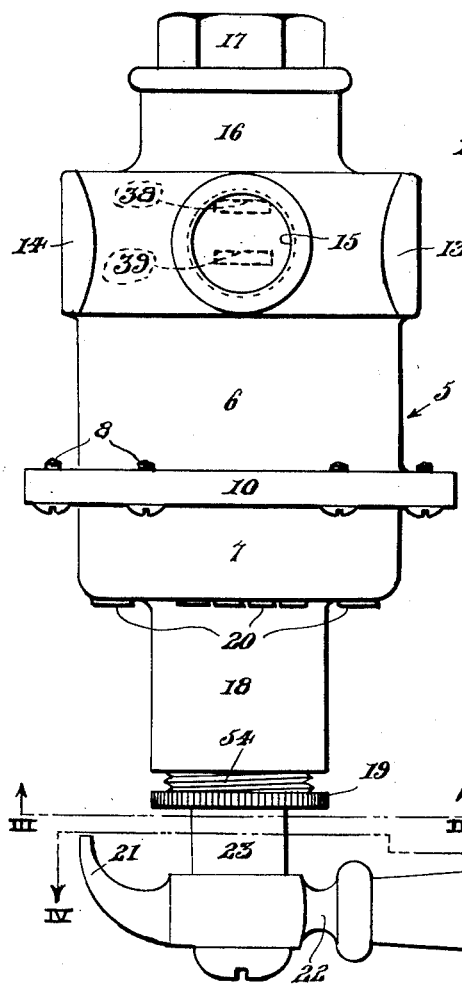
Figure 3:
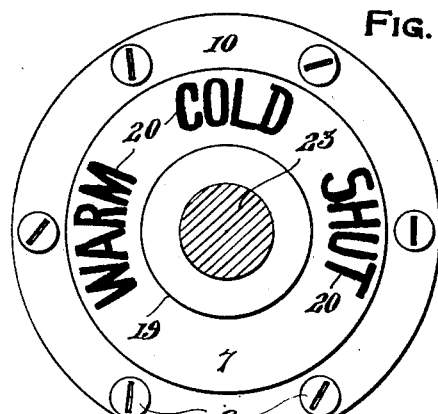
Figure 4:
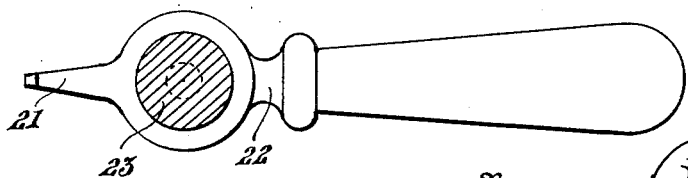
Figure 5:
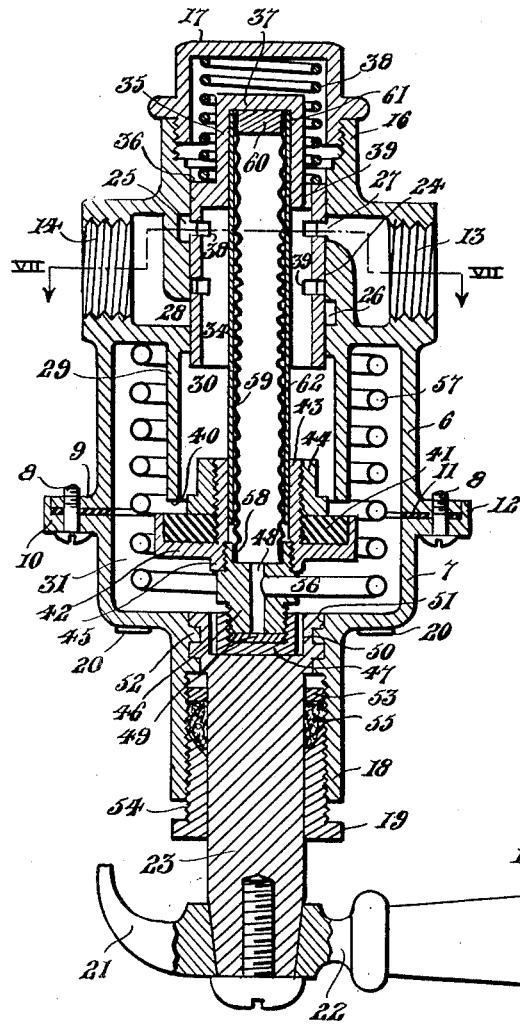
Figure 6:
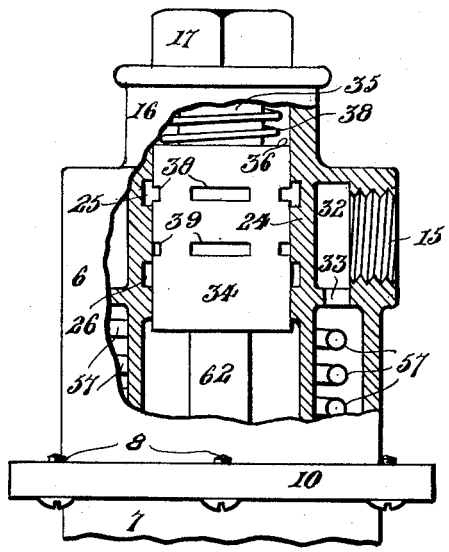
Figure 7:
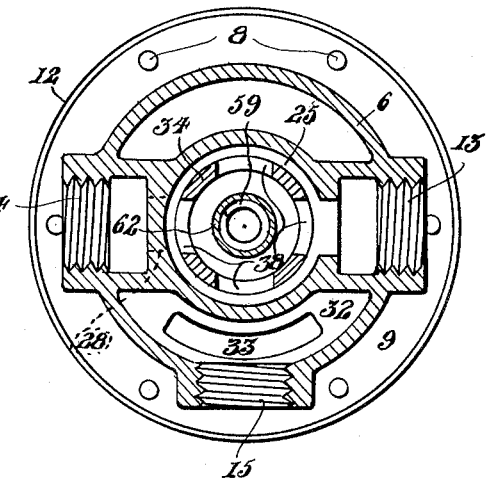

Other objects and advantages of the invention will be apparent during the course of the following description:

In the accompanying drawings forming a part of this specification and in which like numerals are employed to designate like parts throughout the same, Figure 1 is a bottom plan view of the thermostatic mixing valve embodying this invention, Figure 2 is a rear end elevational view of the structure shown in Figure 1, Figure 3 is a transverse sectional view taken upon line III—III of Figure 1, Figure 4 is a transverse sectional view taken upon line IV—IV of Figure 1, Figure 5 is a longitudinal sectional view taken through the structure shown in Figure 1, Figure 6 is a fragmentary plan view, partly broken away, of the structure shown in the aforementioned figures, and Figure 7 is vertical transverse sectional view taken upon lines VII—VII of Figure 5.

In the drawings, wherein for the purpose of illustration is shown a preferred embodiment of this invention, the numeral 5 designates the mixing valve casing in its entirety which includes the two parts 6 and 7 that are separably connected by the screw 8 which pass through the flanges 9 and 10 carried by the parts 6 and 7 respectively, a washer 11 being interposed between these flanges 9 and 10 and concealed from view by the annular skirt 12 carried by the peripheral edge of the flange 10. Figures 1 and 2 clearly illustrate the casing part 6 as being provided with a cold water inlet 13, a hot water inlet 14 and a common outlet 15. Projecting axially outwardly of the part 6 is a tubular boss 16 which is closed at its outer end by the hollow cap 17 threadedly connected thereto as best illustrated in Figure 5. The part 7 of the valve casing is provided with a stuffing box projection 18 which is closed at its outer end by the packing compressing ring 19 which is threadedly connected to the bore of the part 18. The end portion of the casing part 7 is provided with the indicia 20, clearly illustrated in Figure 3, which is employed to function in combination with the pointer or finger 21 carried by the operating handle 22 which is mounted upon the valve operating rod 23.

The working parts of the valve are clearly illustrated in Figures 5 to 7 inclusive and will be described in connection therewith. It will be noted that the valve casing part 6 is provided with a valve barrel 24 having formed in the inner face of its wall the annular grooves 25 and 26. The annular groove 25 has a port 27 which communicates with the cold water inlet 13 while the groove 26 has a port 28 which communicates with the hot water inlet 14. Projecting through the bore of the valve casing part 6 and concentrically arranged in respect thereto and the valve barrel 24 is a cylindrical member 29 which forms what will be termed the mixing chamber 30. Surrounding the cylindrical member 29, which forms the mixing chamber 30, and projecting into the interior of the valve casing part 7 is a chamber which will be termed a thermostatic chamber 31. Figures 6 and 7 clearly show that the common outlet 15 communicates with a small chamber 32, formed in the casing part 6 outwardly of the valve barrel 24, which communicates with the thermostatic chamber 30 through the arcuate port 33. It will now be seen that the hot and cold water pasing through the supplies 13 and 14 and into the valve barrel 24 through the ports 27 and 28 will flow through the mixing chamber 30 into the thermostatic chamber 31 and from there through the port 33 into the chamber 32 which communicates with the common outlet 15.

Slidably associated with the valve barrel 24 is a sleeve valve 34 having a tubular, concentric extension 35 projecting from one end and reduced in diameter in respect to the sleeve valve body 34 for forming the annular shoulder 36 which performs a function to be described at a later point. The outer end of this tubular extension is closed at 37, as best illustrated in Figure 5. The sleeve valve body 34 is clearly illustrated as being formed with a circular series of circumferentially extending slots 38 which are intended to cooperate with the groove 25 and port 27 for the cold water inlet 13. A second circular series of circumferentially extending slots 39 are formed in the valve body 34 in parallelism with the slots 38 and are intended to cooperate with the groove 26 and port 28 that communicate with the hot water inlet 14. It will now be seen that reciprocal movement of the valve sleeve 34 will permit the hot or cold water supplies to be directly connected with the mixing chamber 30 either independently or both at one time for causing the delivery of water at different temperatures.

For the purpose of forcing the sleeve valve 34 in the direction toward the mixing chamber 30, a spring 38 is provided and bears at one end against the shoulder 36 and at the other end against the inner face of the end wall of the cap 17. It will be noted that the space between the cap 17 and the shoulder 36, and also the end of the extension 35 form a pocket in which water from the supplies 13 and 14 will become trapped. To prevent this trapped water from producing a dash-pot structure which would retard and eventually prevent movement of the sleeve valve 34 toward the cap 17, the shoulder 36 is provided with a vent 39.

It will be noted, by inspecting Figure 5, that the outer edge 40 of the cylindrical member 39 forming the mixing chamber 30 constitutes an ideal valve seat with which a valve may be associated for controlling the communication between the chambers 30 and 31 to stop, if desired, the flow of water from the casing 5 through the common outlet 15. A compression valve washer 41 is provided and is carried by the valve cup 42 having a tubular sleeve 43 projecting axially therefrom toward the sleeve valve 34. This sleeve 43 has threaded thereon a nut 44 which functions to retain the washer 41 in its cup 42. The hub or stem portion 45 of the cup has threadedly connected with its bore a nipple 46. This nipple has threadedly connected to its free end the cap 47 which tightly seals the outer end of the bore 48 of the nipple 46 by means of the lead washer or disk 49.

The valve operating stem, previously referred to by the character 23, has its inner end formed into a pocket 50 within which the cap 47 carried by the nipple 46 is received. It will be noted by inspecting Figure 5 that this cap or nipple end is loosely positioned within the pocket 50. The outer wall 51 of the pocket 50 is provided with a screw thread that cooperates with the threaded portion 52 of the stuffing box part 18 of the valve casing and these threads are of a suitable pitch to cause the small movement of the stem and its pocket 50 in respect to the valve casing to bring about the desired movement of the various parts connected to the nipple 46 with but a partial rotation of the valve stem 23.

The remaining portion of the bore of the packing box 18 is internally screw threaded and has positioned therein a stop ring 53 which surrounds the valve operating stem 23 and functions to limit the outward movement of the stem in respect to the valve casing part 7. Interposed between the stop ring 43 and the packing nut 54 is the packing gland 55 which may be of any desired character or type.

The bore 48 of the nipple 41 has communicating therewith the end 56 of a tubular coil 57 which projects longitudinally through the thermostatic chamber 31 and surrounds the valve cup 42 and the cylindrical member 29 forming the mixing chamber 30. The outer end of this tubular coil 57 is suitably sealed, and loosely engages the end wall of the thermostatic chamber 31. The end of the nipple 46 which is threaded into the bore of the hub or stem 45 has suitably sweated or otherwise connected thereto the end 58 of the axially expansible thermostatic tube 59 which has a plug 60 fastened to its remaining end which, as clearly illustrated in Figure 5 is positioned within the bore of the tubular extension 35 carried by the sleeve valve 34 and bears against the end wall 37 of this extension. This plugged end of the thermostatic tube 59 is suitably connected to the adjacent end 61 of a guiding sleeve 62 which encircles the thermostatic tube 59 and is slidably received at its remaining end in the bore of the sleeve 43 carried by the valve cup 42.

The communicating thermostatic tube 59 and coil 57 are intended to be completely filled with a non-volatile, expansible liquid which may be placed therein and sealed through the bore 48 of the nipple 46 and by the lead disk 49 and cap 53. As an example of the type of solid, expansible, non-volatile liquid suitable for being positioned within the tube and coil 59 and 57 respectively, attention is invited to such liquids as water and kerosene oil. While water may be used in suitable climates, kerosene oil has been found to function very efficiently in all climates and is preferred for this reason. It is to be understood that the various joints and sealed openings of the thermostatic tube 59, the nipple 46, and the coil 57, should be very tight to defeat the "creeping" characteristic of kerosene oil.

The operation of this thermostatic mixing valve may be described in detail as follows: It will be understood that when water is not desired, the handle 22 should be rotated for causing axial movement of the operating stem 23 to seat the compression washer 41 against the seat 40 formed on the free end of the cylindrical member 29. This movement of the compression washer 41, which is of course accompanied by a similar movement of the valve cup 42, will cause the completely filled and consequently, rigid thermostatic tube 59 to move axially and bodily for shifting the sleeve valve 34 to locate the circular series of slots 38 and 39 out of register with the grooves and ports 25 to 28 inclusive.

When a supply of cold water is desired, the operating stem 23 should be actuated to permit the spring 38 to move the sleeve valve 34 into the position illustrated in Figures 5 to 7 inclusive, i. e., with the circular series of slots 38 registering with the groove 25 and port 27 which communicates with the cold water supply 13. The movement of the sleeve valve 34, brought about by the spring 38, will cause the thermostatic tube 59 to move the compression washer 41 away from its seat 40. The cold water will then pass into the sleeve valve bore and from thence into the mixing chamber 30 from which it will escape by the valve seat 40 and valve washer 41 into the thermostatic chamber 31 from which it will pass outwardly through the common outlet 15. When it is desirable to have delivered from the mixing valve warm water the handle 22 should be suitably actuated for causing the slots 38 and 39 to register with both of the grooves 25 and 26. Warm water will then be supplied and discharged from the common outlet 15. If it is desirable to have hot water delivered from the mixing valve, the handle 22 should be actuated for permitting the spring 38 to move the sleeve valve 34 axially until the slots 38 are moved out of register with the groove 25 and port 27 and until the slots 39 are located in register with the groove 26 and 28.

It is to be understood that this thermostat should be set or regulated to prevent the delivery of water having a temperature greater than 100 to 110 degrees Fahrenheit. In view of this fact, should the water being fed into the mixing chamber 30 and thermostatic chamber 31, by way of the hot water inlet 14 and the sleeve valve 34, have a temperature higher than the degree fixed by the thermostat, the tube 29 will be caused to lengthen or expand axially by the expanding of the liquid within this tube and the coil 57. This axial lengthening of the tube 59 will cause the sleeve valve 34 to be moved against the tension of the spring 38 for causing a suitable amount of cold water to be fed into the mixing chamber to lower the temperature of the hot water. It will also be understood that should the cold water supply be shut off or discontinued, the hot water passing through the mixing chamber 30 and the thermostatic chamber 31 will cause the thermostatic tube 59 to expand to such an extent that the sleeve valve 34 will be moved against the tension of the spring 38 sufficiently to place out of register both of the series of slots 38 and 39 and in that way shut off the supply of hot water entirely.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. In a valve of the type described, a casing having a mixing chamber, cold and hot water supplies for the chamber, a thermostatic chamber communicating with the mixing chamber, an outlet for the thermostatic chamber, a valve for controlling the water supplies, a valve for controlling the communication between the two chambers, manual means for operating the latter valve, and a connection between the two valves for causing movement of the second mentioned valve to actuate the first mentioned valve, said connection including a thermostatic element having an extension which projects into the thermostatic chamber, whereby a rise in the temperature of the water passing through the thermostatic chamber above a predetermined degree will cause the valve controlling the water supply to be actuated to vary the mixture.

2. In a valve of the type described, a casing having a mixing chamber, cold and hot water supplies for the chamber, a thermostatic chamber communicating with the mixing chamber, an outlet for the thermostatic chamber, a valve for controlling the water supplies, a valve for controlling the communication between the two chambers, manual means for operating the valve, and thermostatic means for actuating the water supply valve independent of the remaining valve.

3. In a valve of the type described, a casing having a mixing chamber, cold and hot water supplies communicating with said chamber, a reciprocating sleeve valve for controlling the flow and mixing of the water from said supplies, an outlet for the mixing chamber, a compression valve for controlling said outlet, a spring for moving the sleeve valve in one direction, manual operating means for controlling the seating and unseating of the compression valve, and a thermostatic member carried by the compression valve and engaging the sleeve valve to move the latter against the tension of the spring when the compression valve is seated and for moving the sleeve valve against the tension of the spring without movement of the compression valve when the water in the mixing chamber rises above a predetermined temperature.

4. In a valve of the type described, a casing, a mixing chamber in the casing, a thermostatic chamber surrounding the mixing chamber and communicating therewith, cold and hot water supplies for the mixing chamber, a reciprocating valve for controlling said supplies, an outlet for the thermostatic chamber, a valve for controlling the communication between the two chambers, an axially expansible thermostatic tube carried by the last mentioned valve and engaging the supply control valve, a tubular coil communicating with the thermostatic tube and located in the thermostatic chamber, a spring for forcing the supply valve against the thermostatic tube, and an operating handle carried by the casing and loosely engaging the second mentioned valve for moving both valves against the tension of the spring.

5. In a valve of the type described, a casing, hot and cold water inlets and a single outlet for the casing, a single valve controlling the inlets for rendering the inlets separately or simultaneously operable, a mixing chamber for the hot and cold water, a thermostatic chamber communicating with the mixing chamber and outlet, a second valve controlling communication between the two chambers, and a thermostatic device carried by the second valve in direct contact with the first valve for thermally controlling operation thereof.

6. In a valve of the type described, a casing, hot and cold water inlets and a single outlet for the casing, a single valve controlling the inlets for rendering the inlets separately or simultaneously operable, a mixing chamber for the hot and cold water, a thermostatic chamber communicating with the mixing chamber and outlet, a second valve controlling communication between the two chambers, and a thermostatic device carried by the second valve in direct contact with the first valve for thermally controlling operation thereof, a spring for moving the first named valve in one direction and the manual operation of the second valve moving the first valve in the opposite direction.

7. In a valve of the type described, a casing, hot and cold water inlets and a single outlet for the casing, a single valve controlling the inlets for rendering the inlets separately or simultaneously operable, a mixing chamber for the hot and cold water, a thermostatic chamber communicating with the mixing chamber and outlet, a second valve controlling communication between the two chambers, and a thermostatic device carried by the second valve in direct contact with the first valve for thermally controlling operation thereof, said first valve being of tubular formation and closed at its upper end and said thermostatic device carried by the second valve including a longitudinally expansible member extending into the tubular valve and contacting the closed end thereof.

8. In a device of the type described, a casing, hot and cold water inlets and a single outlet for the casing, a single valve controlling the inlets for rendering the inlets separately or simultaneously operable, a mixing chamber for the hot and cold water, a thermostatic chamber communicating with the mixing chamber and outlet, a second valve controlling communication between the two chambers, and a thermostatic device carried by the second valve in direct contact with the first valve for thermally controlling operation thereof, a spring for moving the first named valve in one direction and the manual operation of the second valve moving the first valve in the opposite direction, said first valve being of tubular formation and closed at its upper end and said thermostatic device carried by the second valve including a longitudinally expansible member extending into the tubular valve and contacting the closed end thereof.

9. In a valve of the type described, a casing, hot and cold water inlets and a single outlet for the casing, a manually operable valve controlling communication between the two inlets and single outlet, a single valve controlling the two inlets and operable to render the inlets separately or simultaneously operable, a spring for moving the last named valve in one direction and a thermostatic device carried by the first named valve engaging the second valve to automatically shift the latter against spring tension thereon for controlling the inlets.

10. In a valve of the type described, a casing, hot and cold water inlets and a single outlet for the casing, a manually operable valve controlling communication between the two inlets and single outlet, a single valve controlling the two inlets and operable to render the inlets separately or simultaneously operable, a spring for moving the last named valve in one direction and a thermostatic device carried by the first named valve engaging the second valve to automatically shift the latter against spring tension thereon for controlling the inlets, said thermostatic device being manually shiftable with the first valve to permit movement of the second valve and opening of the inlets.

11. In valve mechanism, a casing, supply and outlet means, a valve controlling the supply means, a valve for the outlet means, means for moving the supply valve to an open position, and a thermostatic device carried by the valve for the outlet means and engaging the valve for the inlet means for automatic operation thereof.

In testimony whereof I affix my signature.

JAMES J. LAWLER.